United States Patent [19]

Dubots et al.

[11] Patent Number: 4,625,503
[45] Date of Patent: Dec. 2, 1986

[54] METHOD AND DEVICE FOR STRANDING MULTIFILAMENT SUPERCONDUCTOR STRANDS

[75] Inventors: Patrick Dubots, Neauphle le Chateau; Jean-Claude Kermarrec, Velizy Villacoublay; Jean-Pierre Tavergnier, Linas, all of France

[73] Assignee: Alsthom-Atlantique, S.A., Paris, France

[21] Appl. No.: 747,992

[22] Filed: Jun. 24, 1985

[30] Foreign Application Priority Data

Jun. 28, 1984 [FR] France .................. 84 10220

[51] Int. Cl.[4] .................. D02J 13/00; D07B 3/00
[52] U.S. Cl. .................. 57/6; 57/9; 57/59; 57/282
[58] Field of Search ............. 57/3, 6, 9, 10, 13–15, 57/282, 59, 290; 29/203 R, 203 D, 728

[56] References Cited

U.S. PATENT DOCUMENTS 3,699,647  10/1972  Bidault et al. .
4,009,561   3/1977  Young .................. 57/6
4,329,539   5/1982  Tanaka et al. .

OTHER PUBLICATIONS

Ultra–Fine NbTi Filament Wires for A.C. Use, p. 1 and FIG. 2, by P. Dubois, P. Dubots, A. Fevrier, J. C. Renard, J. Goyer and H. G. Ky of Laboratoires de Marcoussis, presented at The International Conference on Cryogenics, Aug. 1984, Helsinki, Finland.

*Primary Examiner*—Donald Watkins
*Attorney, Agent, or Firm*—Kenyon & Kenyon

[57] ABSTRACT

Multifilament superconductor strands of less than 1 mm diameter able to carry alternating current are stranded to a pitch of between 7 and 3 diameters, at a temperature above 200° C. and a speed between 30 and 5,000 rpm.

7 Claims, 1 Drawing Figure

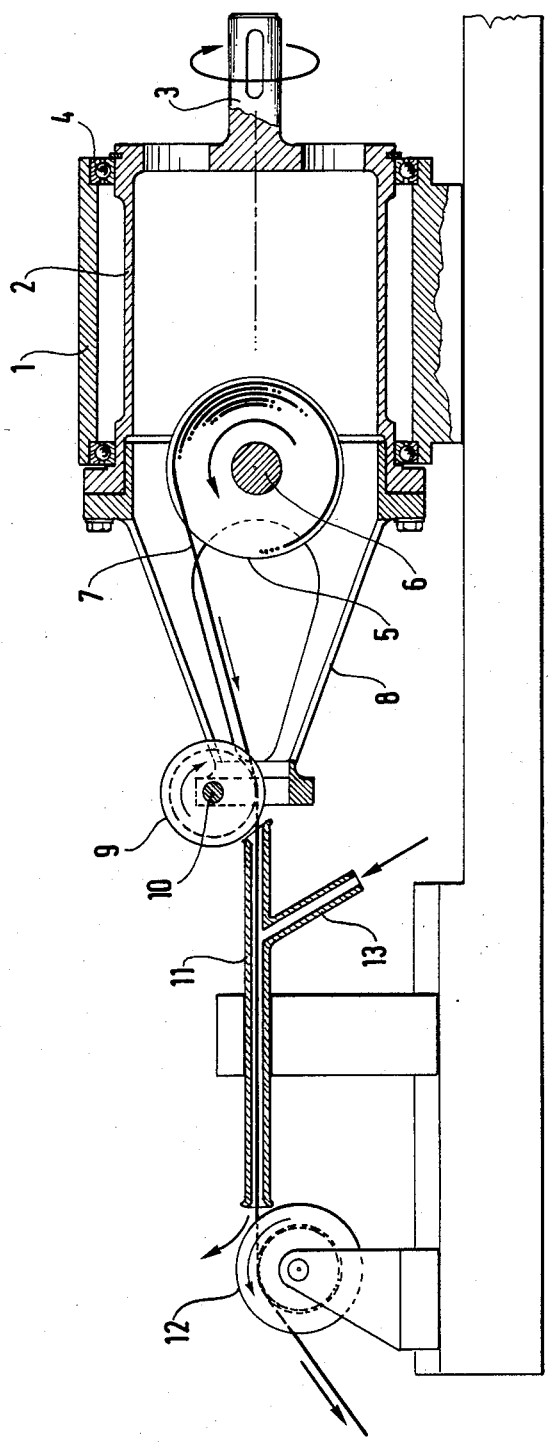

METHOD AND DEVICE FOR STRANDING MULTIFILAMENT SUPERCONDUCTOR STRANDS

This invention concerns a method of twisting or stranding multifilament superconductor strands having a diameter of less than 1 mm and adapted to carry alternating current. It also provides a device for implementing the method.

To keep thermal-magnetic losses to a minimum in superconductor coils formed with such strands, it is known to reduce the diameter of the strands' filaments so as to cut down hysteresis losses, to increase the transverse electrical resistance and to reduce the stranding pitch, which limits induced current losses. Experience showed however that it was not possible to reduce the relative stranding pitch (the ratio of the pitch to strand diameter) to less than 7 without major adverse effects on critical current density. Yet induced current losses, being proportional to the square of the pitch, remain still high for a relative pitch of 7.

This invention is directed to providing twisted strands with a relative stranding pitch substantially less than 7 and going as low as 3, without reducing the critical current density thereof substantially below that of an untwisted strand.

Accordingly, the method of the invention consists in twisting the strands to a pitch in the range of 7 to 3 diameters, at a temperature of at least 200° C. and a speed of between 30 and 5000 rpm.

The strand is preferably heated during twisting by causing a gas which is inert with respect to the filament, i.e. unreactive with the filament, to flow around the strand. In the case of a niobium-titanium alloy-based strand, the twisting or stranding is carried out at a temperature of between 200° C. and 500° C., and in particular at about 250° C., for a strand diameter of 0.12 mm.

The stranding device according to the invention, comprising a payout reel for the straight strand and a takeup reel for the twisted strand, means for rotating the payout reel about an axis perpendicular to its own axis or shaft, said perpendicular axis forming the strand feed axis, and means for pulling the strand along this feed axis, is improved by being further provided with a tube to guide the strand leaving the payout reel and with means for impelling a stream of a hot gas not being reactive with said strand, through said guide tube.

Experience has shown that it is possible with the device according to the invention to offset the feed rate and strand temperature factors against one another; in fact, a relatively low temperature on the strand can be offset by slowing the feed rate, though very low feed rates obviously are of little industrial interest.

A stranding machine adapted according to the invention, for stranding 0.12 mm-diameter, niobium-titanium-based strands will now be described with reference to the single appended FIGURE.

The machine comprises a metal frame 1 surrounding a cylindrical body 2 rotatable about an axis 3 and rotatively driven by a variable speed motor (not shown) and being operable to rotate at 3,000 rpm. on ball bearings 4. The payout reel 5 on a shaft 6 perpendicular to the figure plane unreels the strand 7 at a feedrate of 2 meters per minute, through guiding cone 8, and is braked by an internal O-ring. On leaving the guiding cone, the strand loops onto the reel 9 with main axis 10 perpendicular to the figure plane.

The strand then unreels from reel 9 into the small-diameter cylindrical tube 11 of silica or alumina, arranged between reel 9 and a rotation arresting reel 12 around which the twisted strand forms a few loops. Actual stranding takes place inside tube 11, between reels 9 and 12.

The intake end of tube 11 is provided with an inlet 13 for nitrogen at 250° C., which exits from the other end of the tube.

On leaving the arresting reel 12, the stranded line is forwarded to a takeup reel not depicted in the drawing.

A machine of this type enables stranding a niobium-titanium alloy-based strand up to a relative stranding pitch of 4 or 5 diameters, for which the reduction in critical current density is only about 5%.

Although heating of the strand during the stranding process is accomplished in the machine just described by means of a hot gas flow, it should be obvious that this could be effected by other means, such as by induction or by infrared radiation.

The invention finds application in the stranding of multifilament strands of other materials with superconducting properties besides the niobium-titanium alloys mentioned, in particular niobium-tin alloy-based materials.

What is claimed is:

1. A method of producing a twisted multifilament superconductor strand having a low stranding pitch without a substantial reduction in a critical current density of said strand, comprising:
   twisting a multifilament superconductor strand to a pitch of between 3 and 7 diameters; and,
   heating said multifilament superconductor strand to a temperature above 200° C.

2. A method as in claim 1 wherein said strand comprises niobium-titanium filaments, and wherein the step of heating comprises heating said strand to a temperature between 200° C. and 500° C.

3. A method as in claim 1 wherein said strand comprises niobium-titanium filaments, and wherein the step of heating comprises subjecting said strand to a hot gas which is inert to said strand.

4. A method as in claim 1 wherein said strand is substantially 0.12 mm in diameter and comprises niobium-titanium filaments, and wherein the step of heating comprises heating said strand to a temperature of substantially 250° C.

5. An apparatus for twisting a superconductor strand having a plurality of substantially parallel filaments, comprising:
   means for paying out said strand having a plurality of substantially parallel filaments;
   means, coupled to said paying out means, for rotating said strand having a plurality of substantially parallel filaments about a longitudinal axis of said strand;
   means for pulling said strand from said paying out means; and,
   means for taking up and arresting rotation of said strand.

6. An apparatus as in claim 5 further comprising:
   guide tube means, disposed between said paying out means and said taking up and arresting means, for guiding said strand leaving said paying out means; and,
   means for impelling a stream of hot gas through said guide tube means.

7. A method of twisting a superconductor strand having a plurality of substantially parallel filaments, comprising:
(a) paying out, from a first reel, said strand having a plurality of substantially parallel filaments;
(b) rotating said strand having a plurality of substantially parallel filaments about a longitudinal axis thereof;
(c) pulling said strand from said first reel; and
(d) taking up and arresting rotation of said strand on a takeup reel.

* * * * *